United States Patent [19]

Du Charme

[11] 3,882,245

[45] May 6, 1975

[54] USE OF PROSTAGLANDINS IN COMBATING SHOCK

[75] Inventor: Donald W. Du Charme, Kalamazoo, Mich.

[73] Assignee: The Upjohn Company, Kalamazoo, Mich.

[22] Filed: Nov. 23, 1973

[21] Appl. No.: 418,501

Related U.S. Application Data

[63] Continuation of Ser. No. 302,714, Nov. 1, 1972, abandoned, which is a continuation of Ser. No. 159,561, July 2, 1971, abandoned, which is a continuation-in-part of Ser. No. 884,017, Dec. 10, 1969, abandoned, which is a continuation-in-part of Ser. No. 622,029, March 10, 1967, abandoned.

[52] U.S. Cl. ............ 424/318; 424/305; 260/468 D; 260/514 D
[51] Int. Cl............................................ A61k 27/00
[58] Field of Search............................ 424/318, 305

[56] References Cited
UNITED STATES PATENTS 3,296,091   1/1967   Beal et al............................ 424/318
3,639,561   2/1972   Gordon et al...................... 424/318

OTHER PUBLICATIONS

Callingham – The Pharmaceutical Journal, Apr. 25, 1970, pages 433–436.
Chem. Abst., Vol. 69 (1968) page 103476p.
Clegg, Nature – Vol. 209, No. 5028, Mar. 12, 1966, pages 1,137–1,139.

*Primary Examiner*—Sam Rosen

[57] ABSTRACT

A process of treatment for the clinical management of the condition known as shock in which acute peripheral circulatory failure occurs, usually because of injury. The process clinically manages shock by parenteral administration to mammals, for example humans and valuable warm-blooded domestic animals such as dogs and cats suffering from shock a sufficient amount of certain prostaglandins for combating the acute peripheral circulatory failure. The process utilizes a prostaglandin or prostaglandins alone or in conjunction with other medication known to be beneficial in shock.

8 Claims, No Drawings

USE OF PROSTAGLANDINS IN COMBATING SHOCK

This is a continuation of copending application Serial No. 302,714, filed Nov. 1, 1972, now abandoned, which is a continuation of copending application Ser. No. 159,561, filed July 2, 1971, now abandoned, which is a continuation-in-part of copending application Ser. No. 884,017, filed Dec. 10, 1969, now abandoned, which is a continuation-in-part of copending application Ser. No. 622,029, filed Mar. 10, 1967, now abandoned.

BACKGROUND OF THE INVENTION

Since the early work of von Euler wherein "Prostaglandin" referred to a fraction of human semen containing lipid-soluble acids, continued research and development have followed in this area of substances related to prostanoic acid. The latter is represented structurally as

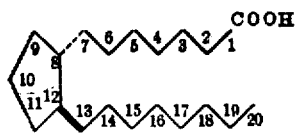

a systematic name for prostanoic acid is 7-[(2β-octyl)cyclopent-1α-yl]heptanoic acid. Isolation and purification of naturally occurring prostaglandins have continued as have preparation of derivatives and biological studies.

Among the known prostaglandins are those referred to as A-type prostaglandins. E-type prostaglandins and F-type prostaglandins by those of skill in the relevant art. Ramwell et al., "Prostaglandins" in *Progress in the Chemistry of Fats and Other Lipids*, Vol. 9, R. Holman Editor, pp. 231–273, Pergamon Press, Oxford, 1968, and references cited therein present a detailed description of preparation methods and nomenclature. Among others U.S. Pat. Nos. 3,069,322; 3,296,091; and British specification No. 1,040,544 describe the prostaglandins. The A-type prostaglandins characterized by a double bond between carbon atoms 10 and 11 in the cyclopentane ring include prostaglandin $A_1$ or $PGA_1$, prostaglandin $A_2$ or $PGA_2$, prostaglandin $A_3$ or $PGA_3$, and dihydro prostaglandin $A_1$ or dihydro $PGA_1$. Similarly, the E-type prostaglandins with a keto group at the 9 position include $PGE_1$, $PGE_2$, $PGE_3$, and dihydro $PGE_1$, while the F-type prostaglandins with a hydroxyl at the 9 position include $PGF_{1\alpha}$, $PGF_{2\alpha}$, $PGF_{3\alpha}$ and dihydro $PGF_{1\alpha}$. The α-designation shows the configuration of the hydroxyl group at the 9 position in the cyclopentane ring.

Pharmaceutically acceptable salts for example, those of alkali metals and alkaline earth bases, such as the sodium, potassium, calcium and magnesium salts; those of ammonia or a basic amine such as mono-, di-, and triethylamines, benzylamine, heterocyclic amines such as piperidine and morpholine, and amines containing water solubilizing or hydrophilic groups such as triethanolamine, tris(hydroxymethyl)aminomethane, and phenylmonoethanoethanolamine are described in U.S. Pat. No. 3,069,322 and British Pat. No. 1,040,544.

The several prostaglandins are to be construed herein as including optically active compounds of the natural configuration and racemic compounds. All of these compounds, including the free acids and salts, are known in the art or can be prepared by known methods. See, for example, U.S. Pat. No. 3,296,091; Belgian Pat. Nos. 736,728 and 747,348; Rec. Trav. Chem. 85, 1233 (1966); ibid. 87, 461 (1968); J. Am. Chem. Soc. 90, 5895 (1968); ibid 91, 5364 (1969); ibid. 91, 5373 (1969); Chem. Communications, 302 (1969); ibid. 602 (1970). The PGFα -type compounds are also prepared by carbonyl reduction of the corresponding PGE-type compounds, advantageously with sodium borohydride according to known procedures. When an active ingredient is named hereinafter, for example, $PGE_2$ or $PGF_{2\alpha}$, the optically active form with the natural configuration is intended. When reference is made to racemic ingredients, the designation racemic or dl is used.

Biological studies of the prostaglandins, for example, actions on smooth muscle, reproductive systems, nervous systems, cardiovascular system, and relationship to lipid and carbohydrate metabolism, and miscellaneous effects are summarized by Bergstrom et al. "The Prostaglandins: A Family of Biologically Active Lipids," Pharmacological Reviews, Vol. 20, No. 1, p. 1 et sequitur, March, 1968, the Williams and Wilkins Company, and references cited therein. Further biological studies include the effect of $PGF_{2\alpha}$ on isolated strips of human pregnant and non-pregnant myomatrium in vitro. Bygdeman (1964) Acta. Physiol. Scand. 63, (suppl. 242), 1; Pickles and Hall (1963) J. Reprod. Fert. 6, 315 and Sandberg et al. (1965) Acta. Obstet, Gynec. Scand, 44, 585. Also Karim, S.M.M. (1966) J. Obstet, Gynaec. Brit. Cwlth. 73, 903 and Karim and Devlin (1967) ibid, 230 have shown that $PGF_{2\alpha}$ is present in human amniotic fluid obtained during labor. Wiqvist et al., Am. J. Obstet, Gyn. 102, 327–332 (1968) studied the effect of prostaglandin $E_1$ on the midpregnant human uterus. They observed that intraamniotic or vaginal administration of $PGE_1$ in high doses had no effect on the uterus. Further, Karim, British Med. J. 4, 618 (1968) has shown that $PGF_{2\alpha}$ appears in the maternal venous blood in variable amounts during labor. It is against this background that the present invention has been conceived and embodied.

BRIEF SUMMARY OF THE INVENTION

This invention relates to a process of treatment, more particularly a process of utilizing certain prostaglandins in effective non-toxic amounts in the clinical management of shock wherein acute peripheral circulatory failure occurs.

DETAILED DESCRIPTION

The clinical condition known as shock is marked by pallor and clamminess of the skin, decreased blood pressure, feeble rapid pulse, decreased respiration, restlessness, anxiety, and sometimes unconsciousness. It is familarly known to follow injury and trauma. However, it manifests itself from other etiology and may be denominated hemorrhagic shock, cardiogenic shock as a sequel to surgical procedures, and endotoxic shock as from generalized systematic infection or the like. Heroic emergency measures are required to successfully manage such shock conditions and the search for beneficial methods and medications continues without cease. It has now been found according to the present invention that certain known prostaglandins suitably combined with pharmaceutical means which adapt the combination for parenteral administration are unexpectedly beneficial in shock, especially the early stages thereof. Apparently the combinations maintain adequate blood perfusion of the vital organs. In contrast to other agents, for example phenoxybenzamine, the prostaglandin does not lower systemic blood pressure, but unexpectedly exerts a pressor response by causing constriction of the veins. Irreversible shock involving profound fall in blood pressure, dilation of veins and venous pooling is prevented.

Generally, the prostaglandin is administered parenterally at a dose of from about 0.1 mcg. to about 25 mcg./kg. per minute. For ease of preparation of an I.V. infusion solution, a prostaglandin acid is dissolved in ethanol and diluted with physiological saline to reach a final concentration of about 100 mcg./ml. in 10% ethanol. Other intraveneously acceptable vehicles can be utilized, for example, water containing one equivalent of sodium bicarbonate; or carbonate. Aqueous solutions containing ethanol, propylene glycol, a polyethylene glycol or dimethylacetamide are useful in embodiments in the form of aqueous preparations for subcutaneous or intramuscular administration according to the inventive concept. The pharmaceutically acceptable salts are especially useful in solution form. Other forms of the prostaglandins are prepared as solutions or suspensions depending on the concentration per unit volume. Hence, the prostaglandin is prepared in a pharmaceutical form, and as exemplified for those skilled in the art said form supplies an effective nontoxic amount for combating shock by venous constriction.

Other known compounds can be used as advantageous supplements to the prostaglandin in dosages known to the art, for example, norepinephrine, dopamine, phenoxybenzamine hydrochloride, phentolamine hydrochloride, chlorpromazine hydrochloride, promethazine hydrochloride, hydrocortisone 21-sodium succinate, methylprednisolone 21-sodium succinate, and fluprednisolone sodium succinate, dexamethasone sodium phosphate, and like steroid compounds.

Unexpectedly, supplementing the prostaglandin with these agents counteracts the undesirable venodilatation caused by these agents but does not counteract the desirable arteriolar dilation which is important for the maintenance of adequate blood perfusion of the vital tissues.

In effectively combating traumatic shock, for example, replacement of lost body fluid is immediately done by intravenous drip, for example dextrose-saline solution. Shortly thereafter a solution of the prostaglandin in about 10% ethanol is infused at the rate of 1 to 25 mcg./kg. per minute into the existing intravenous cannula. If desired, approximately 10 minutes later an additional intravenous infusion of one of the supplementary compounds is begun. Advantageously, a decrease in the amount of fluid required for replacement results because a reduction occurs in the size of the venous side of the circulation.

The following examples describe the manner and process of using the invention and set forth for the best mode contemplated by the inventor of carrying out his invention but are not to be construed as limiting.

EXAMPLE 1

Experimental dogs (12–20 kg.) are prepared with a right ventricular by-pass so that venous blood is routed through a pump providing a constant flow to lungs. Also, a venous stabilization reservoir is placed between the right auricle and the pump to measure changes in the volume of blood flowing to the auricle as an index of venoconstriction. The results obtained from 16 animals subjected to this procedure are shown in the following table.

Table

Effect of Epinephrine and Prostaglandin $F_{2\alpha}$ on Blood Pressure, Pulmonary Perfusion Pressure, and Reservoir Volume

| | Epinephrine | | | | Prostaglandin $F_{2\alpha}$ | | |
|---|---|---|---|---|---|---|---|
| Dose µg/kg | ΔMAP (mm Hg) | ΔPPP (mm Hg) | ΔRes (cc) | V Dose µg/kg | ΔMAP (mm Hg) | ΔPPP (mm Hg) | ΔRES V (cc) |
| 1 | +28 | +3.5 | +18 | 10 | +20 | +16 | +30 |
| 1 | +20 | +4 | +10 | 10 | 0 | +19 | +40 |
| 1 | +16 | +4 | +18 | 10 | 0 | +19 | +56 |
| 1 | +20 | +1.5 | +32 | 1 | +13 | +13 | +8 |
| 0.5 | +16 | 0 | +47 | 10 | 0 | +28 | +14 |
| 0.5 | +24 | +3 | +52 | 10 | +8 | +13.5 | 0 |
| 1 | +10 | 0 | +10 | 10 | 0 | +10 | +45 |
| 0.5 | +20 | +0.5 | +33 | 10 | +18 | +16 | +58 |
| 0.5 | +18 | +2 | +56 | 10 | +16 | +15 | +43 |
| 0.5 | +17 | +1 | +39 | 10 | +12 | +29 | +18 |
| 0.5 | +24 | +2 | +34 | 10 | +18 | +17 | +56 |
| 0.5 | +11 | +2 | +44 | 10 | 0 | +13 | 0 |
| 0.5 | +22 | +2 | +18 | 10 | +7 | +33 | 0 |
| 0.5 | +16 | +1 | +10 | 10 | +10 | +10 | +78 |
| 0.5 | +22 | −10 | +64 | 10 | 0 | +22 | +92 |
| 0.5 | +16 | 0 | +32 | 10 | −4 | +16 | +46 |
| Average* | 18.72 | 1.22 | 39 | | 7 | 16.75 | 38.4 |

*Averages of only 0.5 µg/kg doses of epinephrine and 10 µg/kg doses of $PGF_{2\alpha}$; ΔMAP = change in mean arterial pressure; ΔPPP = change in pulmonary perfusion pressure; ΔRes V = change in reservoir volume.

Prostaglandin $F_{2\alpha}$ at a dose of 10 µg. and epinephrine at 0.5 µg./kg. were found to have approximately equivalent effects on vascular capacity as indicated by the accumulation of blood within the reservoir. It is important to note, however, that this dose of $PGF_{2\alpha}$ caused only a 7 mm. Hg increase in mean arterial pressure, whereas epinephrine caused a 19 mm. Hg increase. Therefore the results of this study indicate that the activity of $PGF_{2\alpha}$ was primarily on the venous side of the circulatory system. Blood accumulating in the reservoir reflects a change in venous capacity rather than arterial capacity, since epinephrine elevated the arterial blood pressure more than twice as much as did PGF$_2$ $\alpha$ and yet caused approximately the same amount of blood loss. Additional evidence in support of this conclusion was obtained from six animals which were given 0.5 µg/kg. of norepinephrine. In these animals the average increase in mean arterial pressure was about the same as that seen with epinephrine (21.2 mm. Hg compared to 18.7 mm. Hg), but the amount of blood accumulating in the reservoir was much less (10.2 cc. compared to 39 cc.). Therefore, the experimental evidence supports the conclusion that a change in the volume of blood contained within the reservoir reflects a change in the capacity of the venous rather than the arterial vasculature.

EXAMPLE 2

Upon entering the hospital emergency service a victim of an automobile accident is disgnosed as being in shock caused by both trauma and hemorrhage. Replacement of lost body fluid is immediately begun by intravenous drip. Shortly thereafter, a solution of 100 ug/ml. of PGF$_2$ $\alpha$ in 10% ethanol is infused at a rate of 1-5 µg/kg./minute into the existing intravenous cannula. Approximately 10 minutes later an additional intravenous infusion of 1 mg./kg. of phenoxybenzamine diluted in 250 to 500 ml. of 5% glucose or 0.9% sodium chloride is begun, also into the existing intravenous cannula, and continued over the course of at least one hour. The infusion of PGF$_2$ $\alpha$ is continued until the patient shows signs of emerging from the shock syndrome.

EXAMPLE 3

Subsequent to major surgery a patient falls into the early stages of shock, showing a mean arterial pressure of about 60 mm. of mercury.

Immediate supportive measures are instituted involving the infusion of dihydro-PGF$_1$ $\alpha$ at a rate of about 20 mcg./kg./minute. Within about 20 minutes the clinical signs indicate beginning recovery and subsequently there is continued recovery with a mean arterial pressure of about 90 mm. of mercury after about 4 hours.

EXAMPLE 4

Similar results are obtained in shock, especially the early stages thereof, utilizing the pharmaceutically acceptable salts of the prostaglandins.

Phenoxybenzamine hydrochloride is used as a supplementary treatment at a dosage of 1 mg./kg. in the form of a dilution in about 500 ml. of 5% glucose or 0.9% sodium chloride. Infusion is continued intravenously for about 1 hour.

EXAMPLE 5

An injured dog is found to be in shock with a mean blood pressure of about 50 mm. of mercury in contrast to the normal mean pressure of about 100 mm.

Infusion of PGF$_1$ $\alpha$ at a dosage of 10 mcg./kg./minute is started. Within about 15 minutes the mean pressure rises to about 80 mm. and thereafter slowly rises to about 100 mm., indicating recovery from the shock syndrome.

EXAMPLE 6

Supplementing treatment of shock by infusion of the patient with a solution of prostaglandin PGF$_3$ $\alpha$ as described above, methylprednisolone sodium succinate is infused at a dosage of 30 mg. given over about 5 minutes. Return to normal mean arterial pressure is achieved in about 3 hours.

EXAMPLE 7

For intramuscular administration a sterile suspension of PGA$_1$ in water is prepared at a concentration of 1.5 mg. per milliliter. One milliliter is administered intramuscularly to a human weighing about 70 kilo as an emergency measure in combating shock prior to hospitalization. Successful results are obtained.

EXAMPLE 8

PGE$_2$ is beneficially administered subcutaneously at a dosage of 15 mcg. per kilo to a human suffering from the preliminary stage of traumatic shock. Thereafter hospitalization and intravenous administration are followed by recovery.

EXAMPLE 9

The tris(hydroxymethyl)aminomethane salt of PGE$_3$ is administered as an aqueous solution intravenously at a rate of 10 mcg. per minute per kilogram to a human suffering from endotoxic shock. Administration continued for about 15 minutes is followed by increasing blood pressure with continued recovery after about 3 hours.

EXAMPLE 10

Equally beneficial results are obtained with the other A-type, X-type and F-type prostaglandins by suitable intravenous, intramuscular and subcutaneous administration in shock conditions in humans and warm blooded animals.

I claim:

1. A method of combating shock which consists essentially of administering parenterally to a mammal in shock a pharmaceutical form supplying a nontoxic effective amount of a prostaglandin selected from the group consisting of an A-type prostaglandin, and E-type prostaglandin, an F-type prostaglandin, and pharmaceutically acceptable salts thereof.

2. The method of claim 1 which includes concommitant parenteral administration of a member selected from the group consisting of norepinephrine, dopamine, phenoxybenzamine hydrochloride, phentolamine hydrochloride, chlorpromazine hydrochloride, promethazine hydrochloride, hydrocortisone sodium succinate, methylprednisolone sodium succinate, fluprednisolone sodium succinate, and dexamethasone sodium phosphate.

3. The method of claim 1 wherein the prostaglandin is administered in a dosage of from about 0.1 mcg. to about 25 mcg./kg.

4. The method of claim 1 wherein the prostaglandin is PGF$_2$ $\alpha$.

5. The method of claim 1 wherein the mammal is a human.

6. The method of claim 1 wherein the mammal is a valuable warm blooded domestic animal.

7. The method of claim 1 wherein the administration is intravenous.

8. The method of claim 7 wherein the nontoxic effective amount is within the range of 0.1 mcg. to 25 mcg. per kilo per minute.

* * * * *